Nov. 28, 1967   W. L. CALVERT ET AL   3,355,340
METHOD AND APPARATUS FOR SECURING SPOUTS TO FILM
Filed Aug. 13, 1964                                  2 Sheets-Sheet 1

INVENTORS
HENRY H. ANDERSON
WILLIAM L. CALVERT
BY John F. Hohmann
ATTORNEY

Nov. 28, 1967  W. L. CALVERT ET AL  3,355,340
METHOD AND APPARATUS FOR SECURING SPOUTS TO FILM
Filed Aug. 13, 1964  2 Sheets-Sheet 2

INVENTORS
HENRY H. ANDERSON
WILLIAM L. CALVERT
BY *John F. Hofmann*
ATTORNEY

United States Patent Office 3,355,340
Patented Nov. 28, 1967

3,355,340
METHOD AND APPARATUS FOR SECURING SPOUTS TO FILM
William L. Calvert and Henry H. Anderson, Westfield, N.J., assignors to Union Carbide Corporation, a corporation of New York
Filed Aug. 13, 1964, Ser. No. 389,252
14 Claims. (Cl. 156—256)

This invention relates to an apparatus for securing spouts to film and a method in connection therewith and more particularly to a method and apparatus for sealing a flanged spout to film.

Several methods are currently in use for the manufacture of spouted film bags which serve as liners in cartons for milk and other flowable materials. One typical method involves cutting a hole in the film with a hot die at one work station, advancing the bored film or web to a second work station, placing a preformed spout over the hole, and sealing the web to the underside of the spout flange with a heated die. Another method involves sealing the web to the underside of the spout flange and simultaneously making knife cuts through the web in a pattern such that the resulting flaps of film remain attached to the edge of the hole. Still another method involves punching a hole in the web in one operation and, at a subsequent time or at another station, inserting the spout through the hole and sealing the web to the top side of the spout flange.

The aforementioned methods, however, manifest a number of deficiencies. For example, attaching the spout with its flange on the outside of the bag is an inherently weaker construction than with the spout flange inside the bag. Furthermore, a hole cutting method which leaves flaps of film attached to the edge of the hole results in some restriction of flow when dispensing flowable materials from the bag. On the other hand, complete cutting of the hole requires removal of a piece of scrap with the attendant risk that an imperfectly removed piece may interfere with the spout seal or may even contaminate the product in the bag. Methods which involve cutting a hole at one work station and attaching the spout at another present problems in accurate registration of the spout with respect to the hole in the film. This problem is particularly acute if the spout is to be inserted through the hole. In cases where hole cutting and spout insertion are performed as separate operations, a cycle time must be lengthened to allow these two operations to be performed in sequence.

Various combinations in the present day methods have resulted in still further disadvantages. For example most cold die hole-cutting techniques require critical alignment of mating die parts, the maintenance of sharp edges on knives, or both. On the other hand, hot die hole-cutting techniques are generally a source of smoke or fumes; and the piece of scrap has, unavoidably, a molten, sticky rim which can be detrimental to the overall process.

Accordingly, it is an object of this invention to provide a method and apparatus for attaching spouts to film which avoid the aforementioned difficulties and limitations.

The present invention provides a simple method and appartus for perforating a film web and simultaneously inserting a spout in the perforation. In the method of the invention, as will be explained, the spout itself is used to perforate the film web. In accordance with the method, a sheet of film is annularly and rigidly supported in the apparatus. A flanged spout member is positioned proximate in a portion of the rigidly supported film. The spout member is then forced through the film in the zone formed by the annular support, advancing the spout through the film until the flange of the spout contacts the film. The flanged portion of the spout is enclosed in firm contact against the film and subsequently sealed thereto.

A further aspect of the present invention includes an apparatus for securing a spout having a flanged portion and a neck portion to film. The apparatus of the invention comprises a lower member having a cavity therein and a lower ram which is reciprocatably mounted in the cavity of the lower member, the lower ram being adapted at one end to support the spout. In addition, an upper member having a bore disposed opposite to the cavity of the lower ram is provided. An upper ram having a cavity for reeciving the neck of the spout is mounted for reciprocatable motion in the bore of the upper member. The upper ram is adapted to clamp the film rigidly against the lower member, the neck portion of the flanged spout piercing the clamped film upon being pushed therethrough by the lower ram.

The apparatus further includes means for securing the flanged portion of the spout to the film.

Figure 1:
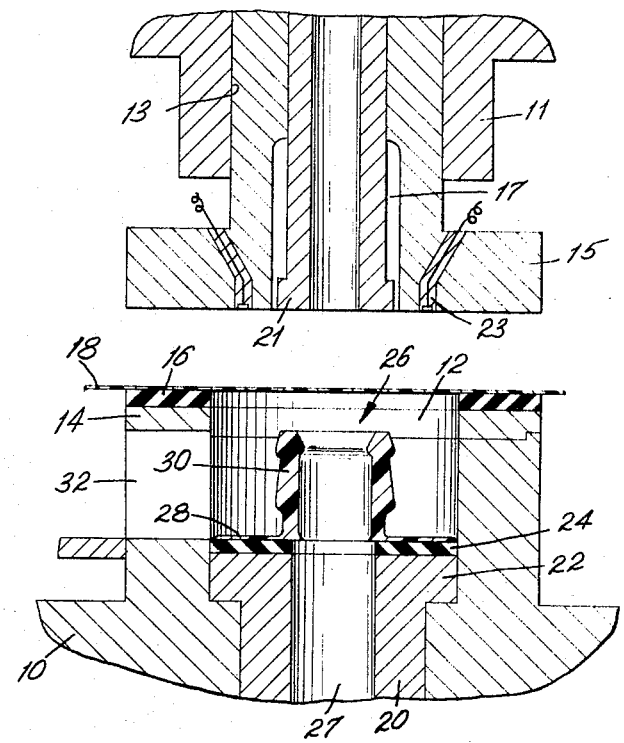
FIG. 1 is a vertical section of an apparatus embodying the invention showing a flanged spout and a sheet of film positioned therein.

Referring now to the drawing, as shown in FIG. 1, the apparatus of the invention includes a lower member 10 having a cavity 12 therein. The lower member 10 is adapted at one end 14, on which may be provided a rubber cushion 16, to support a sheet of film 18. Mounted in the cavity 12 of the lower member 10 and reciprocatable therein, is a lower ram 20 which may be hollow 27. The lower ram 20 is adapted at one end 22, which may also have a rubber cushion 24, to support a spout 26 having a flange portion 28 and a neck portion 30. The spout 26 enters the cavity 12 of the lower member 10 through an opening 32 provided in the side of the lower member 10. The apparatus of the invention further includes an upper member 11 having a bore 13 disposed opposite to the cavity 12 of the lower member 10. An upper ram 15 having a cavity 17 for receiving the neck portion 30 of the spout 26, is reciprocatably mounted within the bore 13 of the upper member 11.

Figure 2:
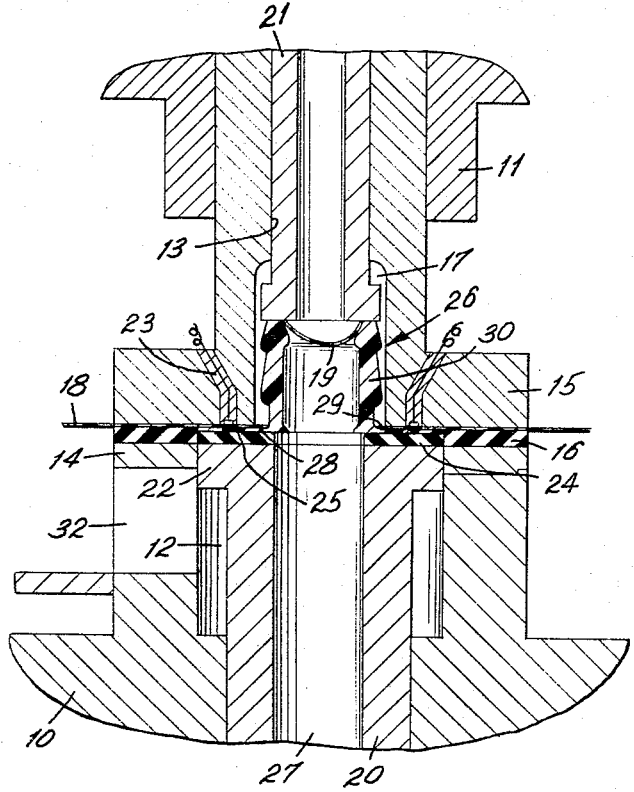
FIG. 2 is a similar view of the apparatus of FIG. 1 showing another stage of operation.
Figure 4:
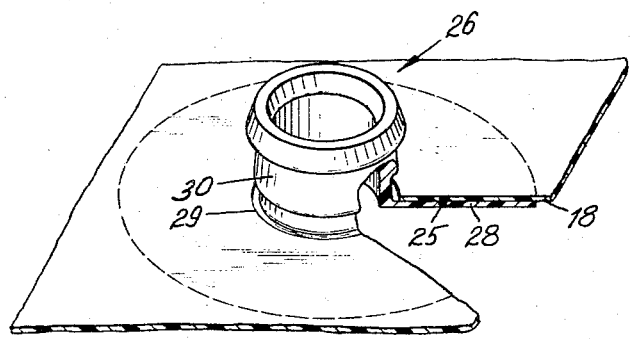
FIG. 4 is an isometric view of the flanged spout and film, part being broken away, illustrating the spout neck extended through the hole punched through the web, and the flange of the spout sealed to the film.

As shown in FIG. 2, when the apparatus is in operation, the upper ram 15 descends, thereby clamping the film 18 rigidly against the lower member 10. The neck portion 30 of the spout 26 pierces the film 18 upon being pushed therethrough by the lower ram 20 forming a hole 29 in the film 18, the hole 29 having the same shape and size as the outside diameter of the neck portion 30 of the spout 26. A piece of film 19 punched from the film 18 when the neck portion 30 of the spout 26 pierces the film 18 is held between the top surface of the spout 26 and a plunger 21, slidably mounted in the cavity 17 of the upper ram 15. The neck portion 30 of the spout 26 continues upward motion through hole 29 in the film 18, into the cavity 17 of the upper ram 15 thereby forcing the plunger 21 to ascend. The flange portion 28 of the spout 26 is clamped against the upper ram 15 by the lower ram 20 so that the flange portion 28 is held on the underside of the film 18. An electrical heating element 23, positioned at one end of the upper ram 15, heat seals the flange portion 28 to the underside of the film 18 (FIG. 4), thereby providing a leakproof seal.

Under continued clamping pressure (FIG. 2), the fused seal 25 of flange portion 28 and film 18 is cooled momentarily. Then, the upper ram 15 is elevated (FIG. 3) to clear the spout 26 from the cavity 17 of the upper ram 15 and to unclamp the loose punched-out scrap of film 19 by raising the plunger 21.

Figure 3:
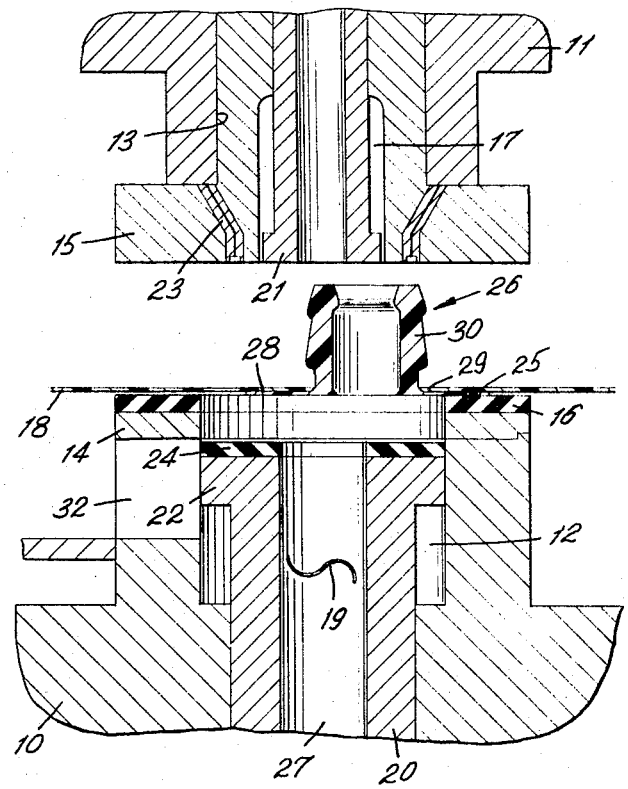
FIG. 3 is a similar view of the apparatus of FIG. 1 showing a still further stage of operation.

As shown in FIG. 3, the punched-out scrap piece of film 19 is drawn downward by vacuum through the spout 26, thence through the hollow 27 in the lower ram 20 to a scrap collector. Following removal of the scrap piece of film 19 from the spout 26, the spout 26 and film portion 18, to which the spout 26 is sealed, are advanced from the operation area and the process is repeated.

An important advantage of this invention over known methods and apparatus is, that a spout is rammed directly through the film, making its own hole 29 without benefit of hot dies, sharpened blades, or precisely mated cutting dies of any sort. Only one work station is required, because the spout punches its own hole at the heat sealing station. The hole punching and sealing operations are accomplished with one motion, therefore cycle time required is no longer than that required to make the seal. The hole-cutting is accomplished without heat, thus the piece of scrap removed from the film by the spout is not sticky and therefore is easily removable if desired. The entire method is automatable and results in the spout attachment configuration known to be inherently strongest; namely, with the spout flange on the underside of the film and the film sealed to the upper surface of the flange. This construction also provides the largest possible, flap-free opening through the spout for unrestricted pouring.

An impulse sealing element 23, positioned at one end of the upper ram, is employed for securing the flange of the spout to the film. It consists of a thin circular ring of resistance wire. Furthermore, the sealing element is electrically insulated from the upper ram and is covered by a non-stick membrane to prevent sticking to the film. A pulse of electrical current applied at the proper time in the cycle causes it to heat up and fuse the film to the upper surface of the spout flange.

The location of the sealing element is not limited to the upper ram. It may be positioned in the lower ram as well, its choice of stationing depending on requirements.

Although the above mentioned spout-securing apparatus is a preferred embodiment, it is possible to employ variations in such assembly and yet realize satisfactory results. For example, it is not essential that the lower member have an opening in the side of its wall for ingress of the spout into the apparatus. The spout may be inserted into the cavity of the lower member before positioning the film across the cavity, by simply raising the upper ram and placing the spout on the lower ram mounted in the cavity of the lower member. Another method would be to draw the lower member downward a sufficient distance under the film to permit placing the spout on the lower ram in the cavity of the lower member.

The plunger described above, is required to clamp the disc of scrap to the top of the spout to insure its complete separation from the edge of the punched hole. Without such clamping, the film may rupture around only part of a circle and remain attached to one edge of the hole. After the disc of scrap is clamped between plunger and spout and completely separated from the web, it is then optional whether heat is applied to seal it to the spout, or it is released and removed by vacuum through the hollow lower ram.

It is preferred that the plunger be spring-loaded so that its movement be easily controlled by the ascending action of the spout. However, any comparable actuating device would be suitable.

For spouts of sufficiently small diameter neck to which a dispensing hose might be attached for example, the spout may simply be forced through the film without detachment or removal of a scrap of film. Consequently, the plunger and the hollow in the lower ram, through which the scrap is evacuated, may be eliminated.

It is to be understood that annularly supporting a portion of the film between the upper ram and lower member implies polygonal support or multi-point support as well as circular support.

The proposed apparatus may be used for securing any thermoplastic spout to any thermoplastic film. While polyethylene is a preferred material, similarly, other polyolefins including polyethylene copolymers, polypropylene, copolymers of ethylene and propylene, and mixtures and laminates of such polyolefins may be used, also. The securing of rubber spouts to rubber sheets or metal spouts to metal sheets and combinations thereof, are other possibilities. Furthermore, adhesives may be used in place of heat sealing for attachment of the spout to film when permitted by the materials of construction and the application.

The apparatus of the invention is especially suitable for manufacturing spouted bags. However, the apparatus can also be used for manufacturing other products where attachment mechanism is desired such as in toys, household and automobile accessories, and the like.

What is claimed is:

1. Apparatus for securing a spout having a flange portion and an neck portion to film said apparatus comprising:
    (a) a lower member having a cavity therein;
    (b) a lower ram mounted for reciprocatable motion in said cavity of said lower member, said ram being adapted at one end thereof to support said spout below said film;
    (c) an upper member having a bore disposed opposite to said cavity of said lower member;
    (d) an upper ram having a cavity for receiving the neck of said spout and being mounted for reciprocatable motion within said bore of said upper member, said upper ram being adapted to clamp said film rigidly against said lower member, said neck portion of said flanged spout piercing said clamped film upon being pushed therethrough by said lower ram; and
    (e) means for securing said flange portion of said spout to said film.

2. Apparatus as defined by claim 1 in which said lower member has an opening near the top of one end thereof enabling said spout to be positioned on said lower ram below said film.

3. Apparatus as defined by claim 1 in which said lower ram is hollow.

4. Apparatus as defined by claim 1 in which said means for securing said spout to said film comprises an electrical heating element.

5. Apparatus as defined by claim 4 in which said electrical heating element is disposed at one end of said upper ram, adjacent to said cavity.

6. Apparatus as defined by claim 4 in which said electrical heating element is disposed at one end of said lower ram, adjacent to said cavity.

7. Apparatus as defined by claim 4 wherein said electrical heating element is annular in shape and provides a leakproof seal of said flange of said spout to said film.

8. Apparatus for securing a spout having a flange portion and a neck portion to film comprising:
    (a) a lower member having a cavity therein;
    (b) a lower ram mounted for reciprocable motion in said cavity of said lower member, said ram being adapted at one end thereof to support said spout below said film;
    (c) an upper member having a bore disposed opposite to said cavity of said lower member;
    (d) an upper ram having a cavity for receiving the neck of said spout and being mounted for reciprocatable motion within said bore of said upper member, said upper ram being adapted to clamp said film rigidly against said lower member, said neck portion of said flanged spout piercing said clamped film upon being pushed therethrough by said lower ram;
(e) means for securing said flange of said spout to said film; and
(f) a plunger slidable mounted within said cavity of said upper ram and adapted to clamp said film against the top surface of said flanged spout.

9. Method for securing a spout having a flange portion and a neck portion to film which comprises:
(a) supporting a sheet of film;
(b) positioning a flange spout member proximate an annularly, rigidly supported portion of said film;
(c) forcing the neck portion of said spout through said film in the zone formed by said annular support;
(d) advancing said spout through the pierced portion of said film until said flange of said spout contacts said film; and
(e) securing said flanged portion of said spout to said film.

10. Method as defined by claim 9 in which said flange of said spout is heat sealed to underside of said film.

11. Method as defined by claim 10 in which said spout and said film are thermoplastic polymeric material.

12. Method for securing a spout having a flange portion and a neck portion to film which comprises:
(a) supporting a sheet of film on a lower member having a cavity therein;
(b) positioning a spout on one end of a lower ram; said lower ram being reciprocatably mounted in said cavity of said lower member;
(c) descending an upper ram having a cavity for receiving the neck of said spout and being mounted for reciprocatable motion within an upper member thereby clamping said film rigidly against said lower member;
(d) actuating said lower ram whereby said neck portion of said flanged spout pierces said clamped film upon being pushed therethrough by said lower ram;
(e) heat sealing said flange of said spout to said film.

13. Method as defined by claim 12 in which said cavity of said upper ram comprises a plunger slidably mounted therein, said plunger clamping said film against the top surface of said flanged spout upon being pushed through said film by said lower ram.

14. Method as defined by claim 12 in which said lower ram is hollow thereby providing egress for waste material caused by said neck of said spout piercing said film.

References Cited

UNITED STATES PATENTS

| | | | |
|---|---|---|---|
| 1,762,832 | 6/1930 | Maynard | 156—120 X |
| 2,710,986 | 6/1955 | Gray | 156—69 X |
| 3,117,050 | 1/1964 | Otstot | 156—120 X |
| 3,128,215 | 4/1964 | Hood et al. | 156—69 |

EARL M. BERGERT, *Primary Examiner.*

H. ANSHER, *Assistant Examiner.*